(12) United States Patent
Liberkowski

(10) Patent No.: US 7,517,017 B1
(45) Date of Patent: Apr. 14, 2009

(54) SYSTEM FOR MULTIPOINT RIGID ATTACHMENT TO A VEHICLE SEAT VIA HEAD REST FEATURES AND VIA CHILD SEAT LATCH ANCHORS

(76) Inventor: Janusz Liberkowski, 15975 Shannon Rd., Los Gatos, CA (US) 95032

( * ) Notice: Subject to any disclaimer, the term of this patent is extended or adjusted under 35 U.S.C. 154(b) by 0 days.

(21) Appl. No.: 11/844,036

(22) Filed: Aug. 23, 2007

(51) Int. Cl.
*A47D 1/10* (2006.01)
*A47C 7/62* (2006.01)

(52) U.S. Cl. .................. 297/253; 297/254; 297/188.04; 297/188.06

(58) Field of Classification Search ................ 297/253, 297/254, 188.04, 188.06
See application file for complete search history.

(56) References Cited

U.S. PATENT DOCUMENTS

| | | | | |
|---|---|---|---|---|
| 1,447,302 A | * | 3/1923 | Gugler | 297/254 |
| 3,157,432 A | * | 11/1964 | Watkins | 297/254 |
| 3,632,165 A | * | 1/1972 | Miller | 297/254 |
| 3,645,548 A | * | 2/1972 | Briner | 297/254 X |
| 3,690,525 A | * | 9/1972 | Koons et al. | 297/254 X |
| 4,215,900 A | * | 8/1980 | Coult | 297/254 |
| 4,647,054 A | * | 3/1987 | Chong | 297/254 X |
| 4,700,988 A | * | 10/1987 | Meyers | 297/254 |
| 4,792,183 A | * | 12/1988 | Townsend, III | 297/188.06 X |
| 4,971,393 A | * | 11/1990 | Maisenhalder | 297/397 |
| 5,332,285 A | * | 7/1994 | Sinnhuber | 297/254 X |
| 5,370,060 A | | 12/1994 | Wang | |
| 5,443,018 A | * | 8/1995 | Cromwell | 108/44 |
| 5,685,603 A | * | 11/1997 | Lane, Jr. | 297/252 X |
| 5,791,614 A | * | 8/1998 | Sims | 297/188.06 X |
| 5,918,934 A | | 7/1999 | Siegrist | |
| 5,941,600 A | * | 8/1999 | Mar et al. | 297/254 X |
| 6,231,017 B1 | * | 5/2001 | Watkins | 248/274.1 |
| 6,260,750 B1 | * | 7/2001 | Chiang | 224/275 |
| 6,264,261 B1 | | 7/2001 | Krafcik | |
| 6,267,441 B1 | * | 7/2001 | Otero | 297/254 |
| 6,267,442 B1 | * | 7/2001 | Shiino et al. | 297/254 |
| 6,315,180 B1 | * | 11/2001 | Watkins | 224/275 |
| 6,439,443 B1 | * | 8/2002 | Liao | 297/188.06 X |
| 6,499,786 B2 | | 12/2002 | Takahashi | |
| 6,502,900 B1 | * | 1/2003 | Johnston | 297/188.06 |
| 6,517,154 B2 | * | 2/2003 | Sawamoto | 297/254 X |
| 6,564,750 B1 | | 5/2003 | Collins | |
| 6,601,914 B1 | * | 8/2003 | Seastrom | 297/188.06 |
| 6,607,241 B2 | * | 8/2003 | Johnston | 297/188.06 |
| 6,629,726 B2 | * | 10/2003 | Johnston | 297/188.06 |
| 6,729,687 B2 | * | 5/2004 | Haverkamp | 297/254 |

(Continued)

FOREIGN PATENT DOCUMENTS

DE        3704972 A1 *  9/1988  ................. 297/254

*Primary Examiner*—Rodney B White
(74) *Attorney, Agent, or Firm*—IDEPA Inc.; Johannes Schneeberger

(57) ABSTRACT

Simple and rigid attachment of a child seat to a vehicle seat that is not degraded by the seat's cushioning is provided by a head rest fixture and two latch anchor fixtures combined by an operationally rigid frame structure. The frame structure has horizontal and vertical telescopically adjustable and lockable features to fit the system to varying dimensions of vehicle seats, head rests and child seat latch anchors. The child seat may be attached to the system via an object connecting structure that is combined with the frame structure via an in between damping element. The damping element opposes vehicle vibration eventually induced via the latch anchors on the operationally rigid frame from reaching the child seat.

16 Claims, 4 Drawing Sheets

U.S. PATENT DOCUMENTS

| | | |
|---|---|---|
| 6,736,456 B2 * | 5/2004 | Okamoto et al. ........ 297/254 X |
| 6,763,986 B2 | 7/2004 | Santos et al. |
| 6,869,141 B2 * | 3/2005 | Yamaoka et al. ............ 297/253 |
| 6,932,407 B2 | 8/2005 | Cuerrier et al. |
| 6,938,958 B2 | 9/2005 | Gold et al. |
| 6,957,854 B1 * | 10/2005 | Seastrom ................ 297/188.04 |
| 6,994,401 B1 * | 2/2006 | Fischer et al. ....... 297/188.04 X |
| 7,111,814 B1 * | 9/2006 | Newman ............ 297/188.06 X |
| 7,201,443 B2 * | 4/2007 | Cilluffo et al. ......... 297/188.06 |
| 7,207,619 B2 | 4/2007 | Yamamoto |

* cited by examiner

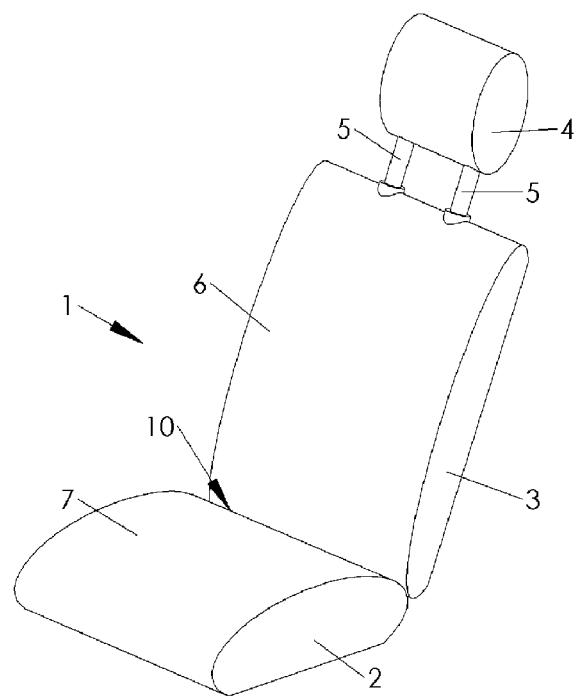
Prior Art Fig. 1A
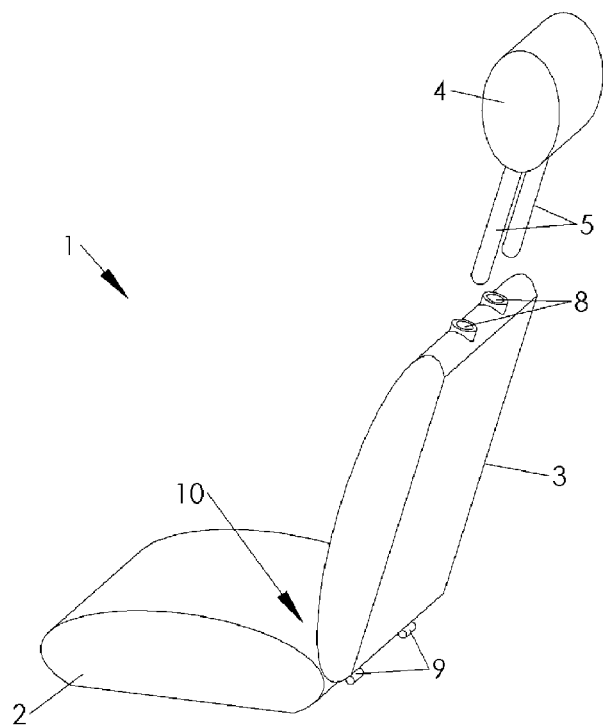
Prior Art Fig. 1B

SYSTEM FOR MULTIPOINT RIGID ATTACHMENT TO A VEHICLE SEAT VIA HEAD REST FEATURES AND VIA CHILD SEAT LATCH ANCHORS

FIELD OF INVENTION

The present invention relates to systems for rigid attachment of an object to a vehicle seat. In particular, the present invention relates to systems for multipoint rigid attachment of an object to a vehicle seat via head rest features and via child seat latch anchors.

BACKGROUND OF INVENTION

For attachment of objects such as a child safety seat to a seat in a vehicle such as a passenger car, a standard for child seat dual point latch anchors has been established. Such well known latch anchors include two horizontal rods recessed in a gap between the backrest and the bottom rest of the vehicle seat. These rods are directly and rigidly attached to the vehicle's frame structure and are intended for a most direct connection of the child seat with the vehicle. A tether attached to the vehicle frame in a distance behind the respective vehicle seat commonly bends around the top edge of the backrest to be attached at an upper end of the child seat. The tether may be tightened to pull the child seat into the backrest cushion. In addition, the child seat may be attached to the latch anchors via members such as belts or the like. Hence, the child seat's attachment to the latch anchors also needs to be tightened. The need to tighten the tether and belts every time the child seat is inserted and removed is cumbersome. It may also be difficult to manually reach into the gap between the backrest and bottom rest to find and attach to the obstructed latch anchors. Furthermore, a certain amount of backlash of the mounted child seat with respect to the backrest remains due to the elastic nature of the backrest's cushioning. Therefore, there exists a need for a system for rigid attachment of an object to a vehicle seat via the child seat latch anchors that does not require tightening of the tether and other belts. Furthermore, there exists also a need for an attachment system that utilizes the child seat latch anchors without need to attach and detach to and from it every time the object is attached or detached from that vehicle seat. The present invention addresses these needs.

A significant majority of passenger car accidents have an impact direction ranging up to 60 degrees in both directions of the vehicle's longitudinal axis. A child safety seat that is directly connected to the dual point attachment features to the contrary may provide reduced opposition to lateral head whip lashing that might occur more likely with increasing angular deviation of the impact direction from the vehicle's longitudinal axis. In addition and due to the seat's cushioning as stabilizing means, the child seat may be still at excessive risk for uncontrolled bouncing in case of a non frontal vehicle impact. Therefore, there exists a need for a system for rigid attachment of an object to a vehicle seat via the child seat dual latch anchors that provides for a substantially rigid attachment that does not rely on belt or tether connections and that is independent of the seat's cushioning. The present invention addresses also this need.

SUMMARY

A system for attaching an object to a vehicle seat via head rest features and via child seat dual latch anchors includes a head rest fixture and preferably two latch anchor fixtures that are combined by a preferably adjustable frame structure. The head rest fixture may include either anchor thorns that fit into the anchor holes instead of the head rest poles or head rest pole clamps that hold on to the head rest poles while the head rest is attached to the backrest. The frame structure has horizontal and vertical telescopically adjustable features to fit the system to varying dimensions of vehicle seats, head rests and child seat latch anchors. The telescopically adjustable features are lockable such that the frame structure is operationally rigid. A pivoting joint in the vicinity of the head rest fixture may provide for increased flexibility of the frame structure during its attachment.

The latch anchor fixtures and head rest fixtures provide for a rigid connection to the vehicle and vehicle seat. An object connecting structure is combined with the frame structure for removable rigidly connecting the object with the frame structure above the backrest and the bottom rest. Damping elements may be in between the object connecting structure and frame structure such that vehicle vibration eventually induced via the latch anchors on the operationally rigid frame structure are substantially blocked from reaching the attached object. The clamping elements may also be configured as torsion springs that provide spring opposed rotation of the object connect structure around an at least close to vertical axis. In that fashion, any object such as a child seat may be quick and ergonomically attached rigidly to the vehicle seat and the vehicle frame while eventually providing angular impact adjustment.

BRIEF DESCRIPTION OF THE FIGURES

Prior Art FIGS. 1A, 1B depict a prior art vehicle seat with child seat dual latch anchors and a head rest.

DETAILED DESCRIPTION

Figure 2:
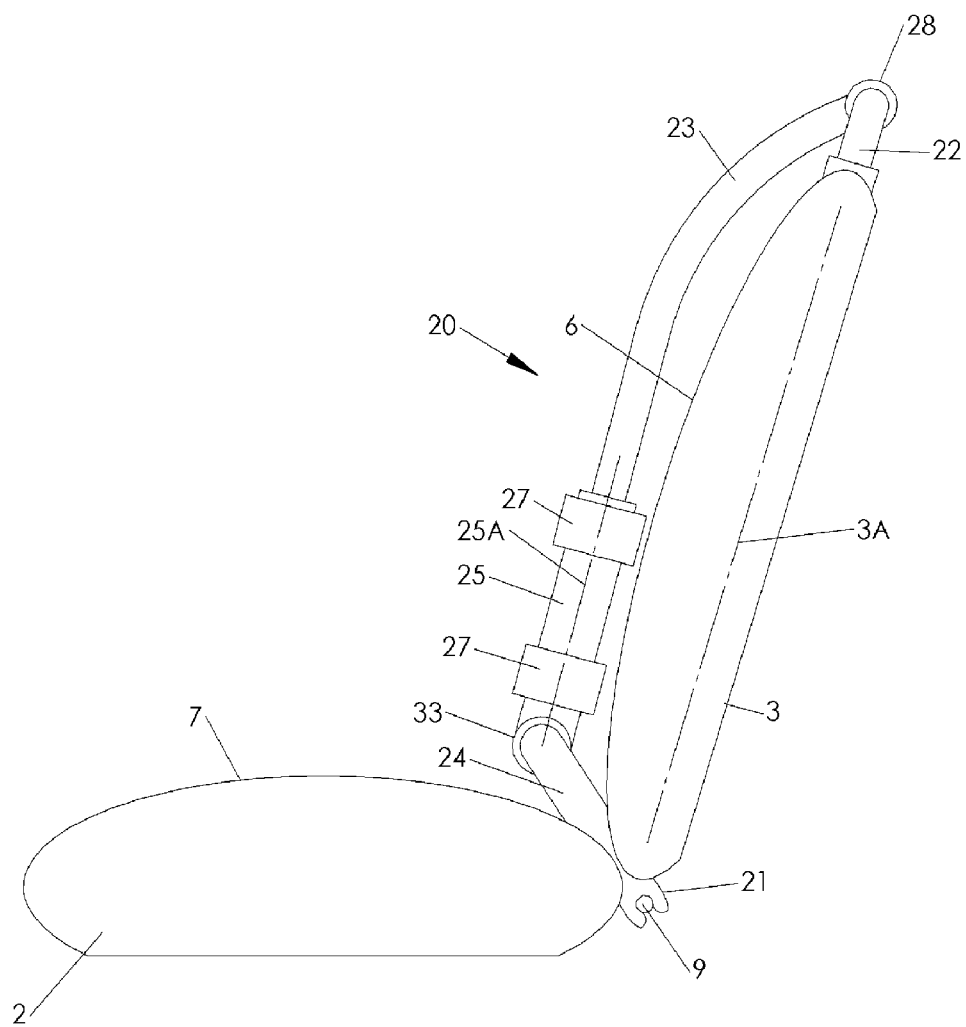
FIG. 2 is a side view of the prior art vehicle seat of FIGS. 1A, 1B without head rest and with assembled partial system according to a first embodiment of the present invention.

As depicted in FIGS. 1A and 1B, a prior art vehicle seat 1 may have a bottom rest 2, a backrest 3 and a head rest 4 that is connected to the backrest 3 via head rest poles 5 inserted in head rest anchor holes 8 at the top of the backrest 3. Bottom rest 2 and backrest 3 have respective surface shapes 7, 6. Bottom rest 2 and backrest 3 are commonly cushioned for seating comfort and for absorption of vehicle vibrations as is well known in the art. Dependent on an indentation topology that includes local cushioning hardness and local cushioning depth, any object pushed into the bottom rest 2 and/or backrest 3 may be varyingly soft suspended.

Bottom rest 2 and backrest 3 commonly touch in a contact fold 10 behind which well known child seat dual latch anchors 9 may be positioned in passenger cars. The latch anchors 9 depicted in simplified fashion in the FIGS. 1B, 2 may be standardized in position with respect to the vehicle seat 1 and spacing with respect to each other. To access the latch anchors 9, one has to push through the contact fold 10 any structure intended to be attached to the latch anchors 9.

Figure 3:
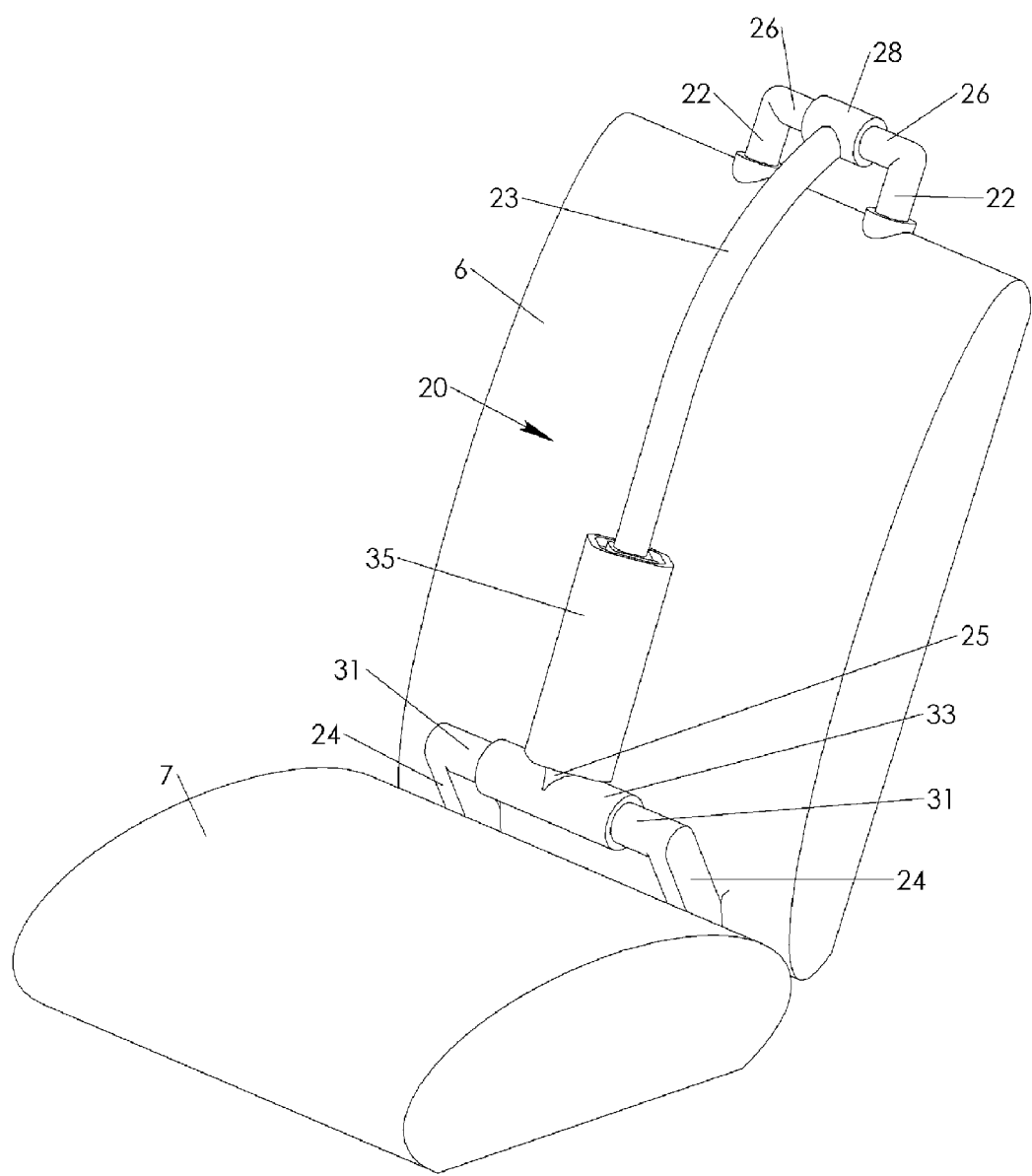
FIG. 3 is a perspective view of the FIG. 2 contents including an object connect structure of the system.
Figure 4:
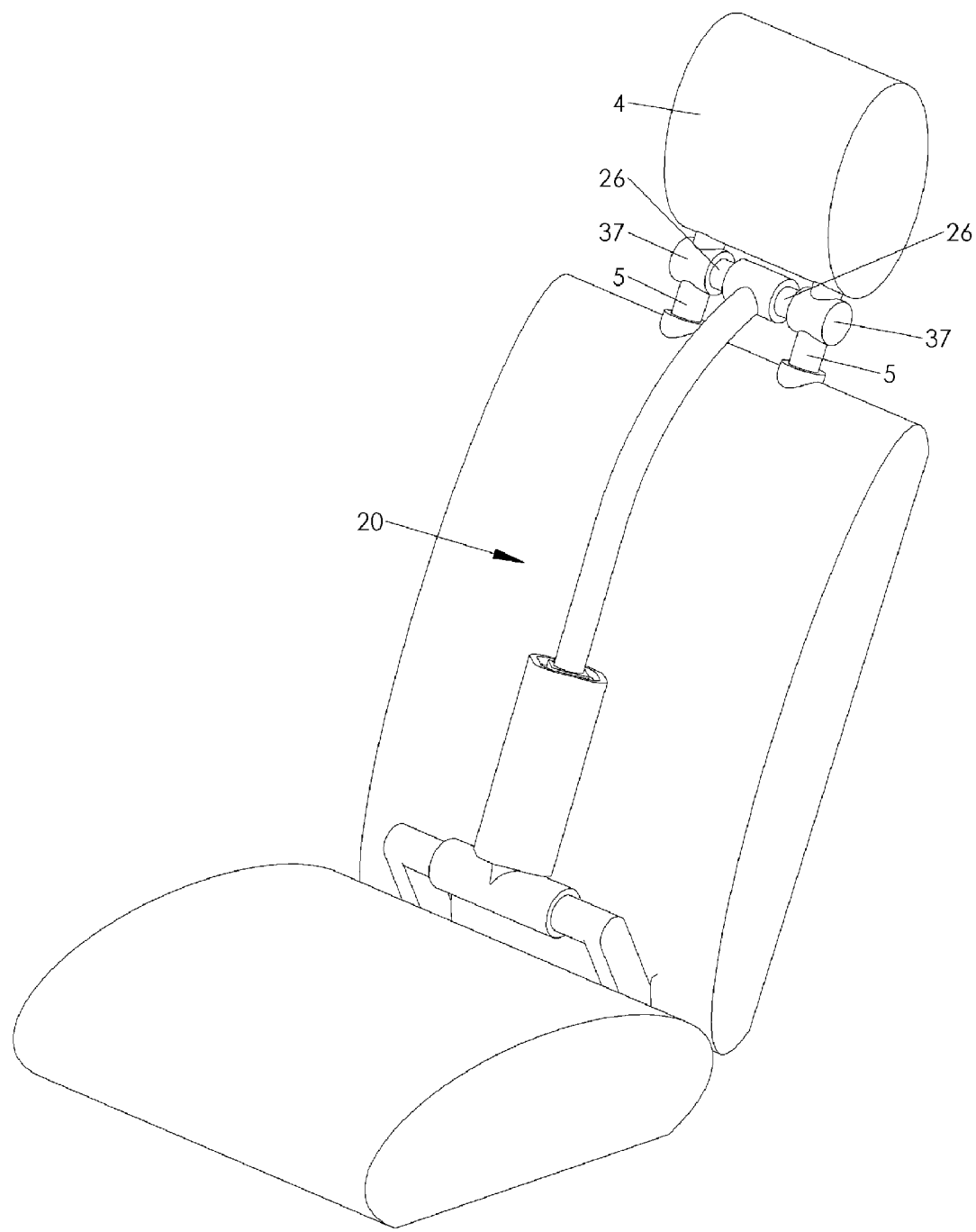
FIG. 4 is a perspective view of the vehicle seat with head rest and the assembled system according to a second embodiment of the invention.

In FIGS. 2-4 is depicted a multipoint rigid attachment system 20 for attaching an object such as a child seat to a vehicle such as a passenger car having a seat 1 with a head rest 4 and a seat recessed latch anchor 9. The system 20 includes head rest fixture(s) 22 and/or 37, latch anchor fixture(s) 21, an object connecting structure 35 and a frame structure. The head rest fixture(s) 22 and/or 37 is(are) configured for top attaching to a head rest attachment feature(s) such as the head rest pole(s) 5 and/or the head rest anchor hole(s) 8. The latch anchor fixture(s) 21 are configured to manually assisted penetrate the contact fold 10 and to bottom snap on the seat recessed latch anchor(s) 9.

The frame structure includes a backrest bridging profile 23, latch arm(s) 24, an optional base profile 25, optional top spacing features 26, optional pivoting joint 28, latch arm connector(s) 31, and optional bottom telescoping fixture 33. At the bottom end(s) of the respective latch arm(s) 24 is(are) the latch anchor fixture(s) 21. The latch arm(s) 24 is(are) configured with a straight and smooth outside contour propagating in assembled position preferably perpendicular with respect to the contact fold 10 and preferably angle symmetric to the surface shapes 6, 7 in the vicinity of the contact fold 10 for non destructively and naturally penetrating the contact fold 10. Naturally penetrating in context with the present invention means that the forces laterally exerted onto the latch arm(s) by the displaced cushioning of backrest 3 and bottom rest 2 cancel each other substantially out and substantially no lateral force is induced onto the latch arm(s) 24 while pushed through the contact fold 10.

According to a first embodiment, the head rest fixture 22 may be an anchor thorn 22 having a configuration including a diameter, a length and a cross section geometry such that it is exchangeable with the head rest pole(s) 5 and such that the anchor thorn 22 may be inserted in the head rest anchor hole(s) 8 while the head rest 4 and its head rest pole(s) 5 is(are) removed from the anchor hole(s) 8.

According to a second embodiment, the head rest fixture 37 may be a head rest pole clamp 37 having a configuration including a diameter and a cross section geometry that matches the head rest pole(s) 5 such that the head rest pole clamp 37 may be clamped to the head rest pole(s) 5 while the head rest pole(s) 5 is(are) inserted in the respective head rest anchor hole(s) 8. Since prior art head rests 4 feature commonly two head rest poles, the system 20 may preferably employ also two head rest fixtures 22 and/or 37.

The head rest pole clamp 37 may circumference the respective head rest pole 5 in any well known combination with any well known tightening element such as a screw. In particular, the head rest pole clamp 37 may consist only of a head rest pole bushing snugly surrounding at least more than 180 degrees of the respective cross section contour of the head rest pole 5. This cross section contour may be circular or may have any other geometrical shape. A bushing in the context of the present invention is any structure radially substantially fixed on the respective head rest pole 5 and axially and circumferentially eventually loose. In the latter case, rigid over all attaching of the system 20 is still warranted by the operational rigidity of the frame structure and the form fitting bottom snap on of the latch anchor fixtures 21 as may be well appreciated by anyone skilled in the art.

Multipoint rigid attachment is provided by at least three point attachment by preferably two latch anchor fixtures 21 and at least one head rest fixture(s) 22/37. Nevertheless and since head rests 4 commonly utilize two head rest poles 5, there are preferably also two head rest fixture(s) 22/37 employed.

The frame structure combines the head rest fixture(s) 22/37 and the latch anchor fixture(s) 21 in a backrest 3 bridging spacing and in an orientation with respect to each other such that the head rest fixture(s) 22/37 and the latch anchor fixture(s) 21 may be concurrently top attached and bottom snapped on. The frame structure is operationally rigid and configured to conform to the surface shape(s) 6 and 7 and eventually to the indentation topologies of backrest 3 and bottom rest 2 such that the top attaching of the head rest fixture(s) 22/37 and the bottom snap on of the latch anchor fixture 21 is substantially unimpeded by the backrest 3 and the bottom rest 2. Substantially unimpeded in context of the present invention excludes eventual friction resistance of backrest 3 and bottom rest 2 through the contact fold 10. Such friction resistance may vary with shape(s) 6, 7 and indentation topologies of back and bottom rests 3, 2 as may be appreciated by anyone skilled in the art.

The optional pivoting joint 28 in the vicinity of the head rest fixture 22/37 provides for a pivoting of the main frame structure such that the latch anchor fixture(s) 21 is/are bottom snapped on in a pivoting motion around the pivoting joint while the head rest fixture 22/37 is already top attached. This may simplify the attachment of the system 20 since the top attachment and bottom snap on may be accomplished in consecutive order and eased by providing alignment of the latch anchor fixture(s) 21 with the eventual out of sight latch anchor(s) 9.

In the preferred case of two employed head rest fixtures 22/37, one or two top spacing features 26 telescopically connect a respective head rest fixture 22/37 to a matching top portion 28 of the backrest bridging profile 23. The telescopic connection between top spacing fixtures 26 and matching top portion 28 may operate as the above described pivoting joint 28 before the telescopic connection is fixed. In that way, one anchor thorn 22 or head rest pole clamp 37 is top telescopically adjustable and fixable with respect to one other anchor thorn 22 or head rest pole clamp 37 irrespective a variable spacing between two utilized head rest poles 5 or head rest anchor holes 8. The top spacing features 26 may be interchangeable to span larger distances in case of backrest bridging profile 23 being positioned for example in the middle of a passenger car rear bench in between two dedicated bench sitting areas and in between two respective head rests 4.

To accommodate for varying backrest 3 heights, the backrest bridging spacing between the head rest attachment features 4/5 and the contact fold 10 and/or the seat recessed latch anchors 9 may be provided in a variable fashion by the backrest bridging profile 23 and the base profile 25. For that purpose, the backrest bridging profile 23 may be vertically telescopically adjustable and fixable with respect to the base profile 25. During initial assembly, the backrest bridging profile 23 may be kept loose with respect to the base profile 25 to provide the system 20 with increased assembling flexibility.

The base profile 25 in turn may be connected to a concentrically surrounding object connect structure 35 via a number of resilient element(s) 27. The object connecting structure 35 depicted in simplified form may have other well known features for rigidly snap connecting an object such as a child seat as may be well appreciated by anyone skilled in the art. The resilient element(s) 27 may be configured as vibration damper(s) such that propagation of eventual vehicle vibrations induced onto the frame structure via the head rest attachment feature(s) 4/5 and/or the latch anchors 9 is opposed onto the object connect structure 35 and further. The resilient element(s) 27 may also be configured as a torsion spring such that the object connecting structure 35 and any object attached to it may spring resistant rotate around a protrusion axis 25A of the base profile 25.

The protrusion axis 25A may be substantially vertical or parallel to an average backrest orientation 3A or in any angle in between the two orientations. Combined damping and torsion spring characteristics of the resilient element 27 are preferably provided by a radially varying outside contour of the base profile 25 such as a square outside contour. The resilient element 27 may be of a rubber material snugly encompassing at least a portion of the base profile's 25 outside contour along the protrusion axis 25A. The resilient element(s) 27 may be bonded or otherwise well known connected to the base profile 25. The object connecting structure 35 may also have a radially varying inside contour such as a square inside contour. The resilient element may also be bonded or otherwise connected and snugly fitting to that square inside contour. Preferably two such resilient elements 27 may be placed close to top and bottom ends of the base profile 25. Due to the rotationally massive interlocking of the resilient element(s) 27 with base profile 25 and object connecting structure 35, the resilient element 27 may be of relatively soft rubber with high vibration damping while at the same time high rotational torque spring rate is provided.

In the preferred case of two employed latch anchor fixtures 21, the frame structure may include also two latch arm connectors 31 each laterally connecting one latch arm 24 at its respective top end to the backrest bridging profile 23. Alternately and in the preferred case of vertical telescopic adjustability of the frame structure, the two latch arm connectors 31 connect to the base profile 25 instead of the backrest bridging profile 23.

The frame structure may also include a bottom telescoping fixture 33 that is bottom connected to either backrest bridging profile 23 or preferably and as explained in the above paragraph to the base profile 25. In that way, the latch arm connectors 31 are horizontally telescopically adjustable and fixable. Lateral spacing between dual latch anchors 9 may be standardized to the inventors knowledge with about 11 inches. Nevertheless, the bottom telescoping fixture 33 may be employed for example in a case where the system 20 is intended to be assembled in the middle position of a passenger car rear bench as explained above.

The system 20 may be conveniently attached by removing first the head rest 4 and inserting the anchor thorn(s) 22 in the head rest anchor holes 8. In case of employed head rest pole clamp(s) 37, the head rest poles 5 may be inserted through them and reinserted in the head rest anchor holes 8. Next, the latch arms 24 may be pushed through the contact fold 10 at a position already predefined by assembled head rest fixture(s) 22/37 such that a snapping on the latch anchors 9 is warranted even though the latch anchors 9 may be out of sight. Once the latch anchor fixture(s) 21 are snapped on, the backrest bridging profile 23 may be fixed with respect to the base profile 25. The system 20 may be left in place for extended time. Whenever an object such as a child seat needs to be fixed inside the passenger car, it may be easily attached to the readily accessible object connecting structure 35 in a simple snap on fashion. The latch anchor fixture 21 may also feature any well known release mechanism to conveniently disengage it from the latch anchors 9 once the system 20 needs to removed again. In a third embodiment, the object connecting structure 37 may be integral part of a child safety seat or child safety seating frame.

Accordingly, the scope of the invention described in the figures and the specification above is set forth by the following claims and their legal equivalent:

What is claimed is:

1. A multipoint rigid attachment system for attaching an object to a vehicle having a seat with a head rest and a seat recessed latch anchor, said multipoint rigid attachment system comprising:

a. a head rest fixture comprising at least one of an anchor thorn and a head rest pole clamp configured to attach to a head rest attachment feature;
   b. a latch anchor fixture that is configured to snap on said seat recessed latch anchor;
   c. a frame structure combining said head rest fixture and said latch anchor fixture in a spacing that is bridging a backrest of said seat between said head rest and said seat recessed latch anchor while said head rest fixture being attached to said head rest fixture and while said latch anchor fixture being snapped on;
   d. an object connecting structure combined with said frame structure for removably connecting said object with said frame structure above a surface shape of at least one of a backrest and a bottom rest of said seat;
   wherein:
      i. said anchor thorn comprises a configuration such that it is exchangeable with a pole of said head rest; and
      ii. said head rest pole clamp comprises a configuration that is matching said pole for clamping said head rest pole clamp to said pole while said pole is inserted in a head rest anchor hole of said seat.

2. The multipoint rigid attachment system of claim 1, wherein said head rest pole clamp consists of a head rest pole bushing.

3. The multipoint rigid attachment system of claim 1, further comprising a pivoting joint in the vicinity of said head rest fixture such that said latch anchor fixture is snapped on in a pivoting motion around said pivoting joint while said head rest fixture is attached.

4. The multipoint rigid attachment system of claim 1, further comprising a top telescopic connection to telescopically adjust one of said anchor thorn with respect to one other of said anchor thorn and said head rest pole.

5. The multipoint rigid attachment system of claim 4, wherein said top telescopic connection is combined with a pivot joint such that said latch anchor fixture is snapped on in a pivoting motion around said pivoting joint while said first head rest fixture is operationally fixed.

6. The multipoint rigid attachment system of claim 1, wherein said frame structure further comprises a backrest bridging profile and a base profile substantially vertically telescopically adjustable and fixable with respect to each other.

7. The multipoint rigid attachment system of claim 6, wherein said object connecting structure is concentrically surrounding said base profile and attached to said base profile via a resilient element.

8. The multipoint rigid attachment system of claim 7, wherein said resilient element is configured as a vibration damper such that propagation of vehicle vibrations induced onto said frame structure are opposed onto said object connecting structure.

9. The multipoint rigid attachment system of claim 7, wherein said resilient element is configured as a torsion spring such that said object connecting structure is spring loaded held against rotating around a protrusion axis of said base profile.

10. The multipoint rigid attachment system of claim 9, wherein said protrusion axis is substantially vertical.

11. The multipoint rigid attachment system of claim 1, further comprising two of said latch anchor fixture, wherein said frame structure further comprises:

a. as part of said frame structure at least one of a backrest bridging profile and a telescopically adjustable profile combination, said telescopically adjustable profile combination including said backrest bridging profile and a base profile;

b. two latch arms configured for non destructively penetrating a contact fold between said backrest and said bottom rest;

c. two latch arm connectors each laterally connecting one of said two latch arms to said frame structure;

wherein each of two of said latch anchor fixture is positioned at a bottom end of said latch arm; and wherein at least one of said two latch arm connectors is connected to a top end of said latch arm.

12. The multipoint rigid attachment system of claim 11, wherein said frame structure further comprises a horizontal telescoping fixture that is connected to said frame structure such that at least one of said latch arm connectors is horizontally telescopically adjustable and fixable.

13. The multipoint rigid attachment system of claim 1, wherein said object connecting structure is an integral part of a child safety seat.

14. The multipoint rigid attachment system of claim 1, wherein said object connecting structure is an integral part of a child safety seating frame.

15. The multipoint rigid attachment system of claim 1, further comprising a top telescopic connection to telescopically adjust one of head rest pole clamp with respect to one other of said head rest pole clamp.

16. The multipoint rigid attachment system of claim 15, wherein said top telescopic connection is combined with a pivot joint such that said latch anchor fixture is snapped on in a pivoting motion around said pivoting joint while said first head rest fixture is operationally fixed.

* * * * *